Oct. 20, 1970 N. C. DE TROYE 3,535,544

MULTISTABLE CIRCUIT ARRANGEMENTS RESPONSIVE TO CLOCK PULSES (JK FLIP-FLOPS)

Filed April 6, 1967 5 Sheets-Sheet 1

INVENTOR.
NICOLAAS C. DE TROYE
BY
Frank R. Jifani
AGENT

| Nr | | | | | | $C_P$ J $\bar{Q}$ | $C_P$ K Q | $N_1$ $N_4$ | $N_2$ $N_3$ | $N_1$ $N_2$ $N_3$ | $N_1$ $N_2$ $N_4$ | $N_5$ $N_8$ | $N_6$ $N_7$ |
|---|---|---|---|---|---|---|---|---|---|---|---|---|---|
| | $C_P$ | J | K | Q | $\bar{Q}$ | $N_1$ | $N_2$ | $N_3$ | $N_4$ | $N_5$ | $N_6$ | $N_7 = Q$ | $N_8 = \bar{Q}$ |
| 1 | 0 | 0 | 0 | 0 | 1 | 1 | 1 | 0 | 1 | 1 | 0 | 0 | 1 |
| 2 | 0 | 0 | 0 | 1 | 0 | 1 | 1 | 1 | 0 | 0 | 1 | 1 | 0 |
| 3 | 0 | 0 | 1 | 0 | 1 | 1 | 1 | 0 | 1 | 1 | 0 | 0 | 1 |
| 4 | 0 | 0 | 1 | 1 | 0 | 1 | 1 | 1 | 0 | 0 | 1 | 1 | 0 |
| 5 | 0 | 1 | 0 | 0 | 1 | 1 | 1 | 0 | 1 | 1 | 0 | 0 | 1 |
| 6 | 0 | 1 | 0 | 1 | 0 | 1 | 1 | 1 | 0 | 0 | 1 | 1 | 0 |
| 7 | 0 | 1 | 1 | 0 | 1 | 1 | 1 | 0 | 1 | 1 | 0 | 0 | 1 |
| 8 | 0 | 1 | 1 | 1 | 0 | 1 | 1 | 1 | 0 | 0 | 1 | 1 | 0 |
| 9 | 1 | 0 | 0 | 0 | 1 | 1 | 1 | 0 | 1 | 1 | 0 | 0 | 1 |
| 10 | 1 | 0 | 0 | 1 | 0 | 1 | 1 | 1 | 0 | 0 | 1 | 1 | 0 |
| 11 | 1 | 0 | 1 | 0 | 1 | 1 | 1 | 0 | 1 | 1 | 0 | 0 | 1 |
| 12 | 1 | 0 | 1 | 1 | 0 | 1 | 0 | 0 | 1 | 1 | 1 | 1 | 0 |
| 13 | 1 | 1 | 0 | 0 | 1 | 0 | 1 | 1 | 0 | 1 | 1 | 0 | 1 |
| 14 | 1 | 1 | 0 | 1 | 0 | 1 | 1 | 1 | 0 | 0 | 1 | 1 | 0 |
| 15 | 1 | 1 | 1 | 0 | 1 | 0 | 1 | 1 | 0 | 1 | 1 | 0 | 1 |
| 16 | 1 | 1 | 1 | 1 | 0 | 1 | 0 | 0 | 1 | 1 | 1 | 1 | 0 |

FIG. 3

INVENTOR.
NICOLAAS DE TROYE
BY
Frank R. Trifari
AGENT

| Nr | | | | | | Cp J $\bar{Q}$ | Cp K Q | $N_1$ $N_4$ | $N_2$ $N_3$ | $N_1$ $N_2$ $N_3$ | $N_1$ $N_2$ $N_4$ | $N_5$ $N_8$ | $N_6$ $N_7$ |
|---|---|---|---|---|---|---|---|---|---|---|---|---|---|
| | Cp | J | K | Q | $\bar{Q}$ | $N_1$ | $N_2$ | $N_3$ | $N_4$ | $N_5$ | $N_6$ | $N_7$ | $N_8$ |
| 1 | 0 | 0 | 0 | 0 | 1 | 1 | 1 | 0 | 1 | 1 | 0 | 0 | 1 |
| 9 | 1 | 0 | 0 | 0 | 1 | 1 | 1 | 0 | 1 | 1 | 0 | 0 | 1 |
| 1 | 0 | 0 | 0 | 0 | 1 | 1 | 1 | 0 | 1 | 1 | 0 | 0 | 1 |
| 5 | 0 | 1 | 0 | 0 | 1 | 1 | 1 | 0 | 1 | 1 | 0 | 0 | 1 |
| : | 1 | 1 | 0 | 0 | 1 | 1* | 1 | 0 | 1 | 1 | 0 | 0 | 1 |
| a | 1 | 1 | 0 | 0 | 1 | 0 | 1 | 0* | 1 | 1 | 0* | 0 | 1 |
| : | 1 | 1 | 0 | 0 | 1 | 0 | 1 | 1 | 1* | 1 | 1 | 0 | 1 |
| 13 | 1 | 1 | 0 | 0 | 1 | 0 | 1 | 1 | 0 | 1 | 1 | 0 | 1 |
| : | 0 | 1 | 0 | 0 | 1 | 0* | 1 | 1 | 0 | 1 | 1 | 0 | 1 |
| : | 0 | 1 | 0 | 0 | 1 | 1 | 1 | 1 | 0 | 1* | 1 | 0 | 1 |
| : | 0 | 1 | 0 | 0 | 1 | 1 | 1 | 1 | 0 | 0 | 1 | 0* | 1 |
| : | 0 | 1 | 0 | 1 | 1 | 1 | 1 | 1 | 0 | 0 | 1 | 1 | 1* |
| 6 | 0 | 1 | 0 | 1 | 0 | 1 | 1 | 1 | 0 | 0 | 1 | 1 | 0 |
| 6 | 0 | 1 | 0 | 1 | 0 | 1 | 1 | 1 | 0 | 0 | 1 | 1 | 0 |
| 14 | 1 | 1 | 0 | 1 | 0 | 1 | 1 | 1 | 0 | 0 | 1 | 1 | 0 |
| 6 | 0 | 1 | 0 | 1 | 0 | 1 | 1 | 1 | 0 | 0 | 1 | 1 | 0 |
| 7 | 0 | 1 | 1 | 0 | 1 | 1 | 1 | 0 | 1 | 1 | 0 | 0 | 1 |
| : | 1 | 1 | 1 | 0 | 1 | 1* | 1 | 0 | 1 | 1 | 0 | 0 | 1 |
| b | 1 | 1 | 1 | 0 | 1 | 0 | 1 | 0* | 1 | 1 | 0* | 0 | 1 |
| : | 1 | 1 | 1 | 0 | 1 | 0 | 1 | 1 | 1* | 1 | 1 | 0 | 1 |
| 15 | 1 | 1 | 1 | 0 | 1 | 0 | 1 | 1 | 0 | 1 | 1 | 0 | 1 |
| : | 0 | 1 | 1 | 0 | 1 | 0* | 1 | 1 | 0 | 1 | 1 | 0 | 1 |
| : | 0 | 1 | 1 | 0 | 1 | 1 | 1 | 1 | 0 | 1* | 1 | 0 | 1 |
| : | 0 | 1 | 1 | 0 | 1 | 1 | 1 | 1 | 0 | 0 | 1 | 0* | 1 |
| : | 0 | 1 | 1 | 1 | 1 | 1 | 1 | 1 | 0 | 0 | 1 | 1 | 1* |
| 8 | 0 | 1 | 1 | 1 | 0 | 1 | 1 | 1 | 0 | 0 | 1 | 1 | 0 |

FIG. 4

INVENTOR.
NICOLAAS DE TROYE
BY
Frank R. Trifari
AGENT

| J | K | $Q_0$ | | $Q_1$ | |
|---|---|---|---|---|---|
| 0 | 0 | 0 | 1 → 9 → 1 | 0 | d |
| 0 | 0 | 1 | 2 → 10 → 2 | 1 | d |
| 0 | 1 | 0 | 3 → 11 → 3 | 0 | d |
| 0 | 1 | 1 | 4 → 12 → 3 | 0 | i |
| 1 | 0 | 0 | 5 → 13 → 6 | 1 | i |
| 1 | 0 | 1 | 6 → 14 → 6 | 1 | d |
| 1 | 1 | 0 | 7 → 15 → 8 | 1 | i |
| 1 | 1 | 1 | 8 → 16 → 7 | 0 | i |

FIG. 5

INVENTOR
NICOLAAS DE TROYE
BY
[signature]
AGENT

| | Nr | | | | | | $C_P$ J $\bar{Q}$ | $C_P$ K Q | $N_1$ $N_4$ | $N_2$ $N_3$ | $N_1$ $N_2$ $N_3$ | $N_1$ $N_2$ $N_4$ | $N_5$ $N_8$ | $N_6$ $N_7$ |
|---|---|---|---|---|---|---|---|---|---|---|---|---|---|---|
| | | $C_P$ | J | K | Q | $\bar{Q}$ | $N_1$ | $N_2$ | $N_3$ | $N_4$ | $N_5$ | $N_6$ | $N_7$ | $N_8$ |
| I | a | 1 | 1 | 0 | 0 | 1 | 0 | 1 | 0* | 1 | 1 | 0* | 0 | 1 |
| | ⋮ | 1 | 1 | 0 | 0 | 1 | 0 | 1 | 1 | 1* | 1 | 0* | 0 | 1 |
| | ⋮ | 1 | 1 | 0 | 0 | 1 | 0 | 1 | 1 | 0 | 1 | 0* | 0 | 1 |
| | ⋮ | 1 | 1 | 0 | 0 | 1 | 0 | 1 | 1 | 0 | 1 | 1 | 0 | 1 |
| | 13 | 1 | 1 | 0 | 0 | 1 | 0 | 1 | 1 | 0 | 1 | 1 | 0 | 1 |
| II | a | 1 | 1 | 0 | 0 | 1 | 0 | 1 | 0* | 1 | 1 | 0* | 0 | 1 |
| | ⋮ | 1 | 1 | 0 | 0 | 1 | 0 | 1 | 0* | 1 | 1 | 1 | 0 | 1 |
| | ⋮ | 1 | 1 | 0 | 0 | 1 | 0 | 1 | 1 | 1* | 1 | 1 | 0 | 1 |
| | 13 | 1 | 1 | 0 | 0 | 1 | 0 | 1 | 1 | 0 | 1 | 1 | 0 | 1 |
| III | b | 1 | 1 | 1 | 0 | 1 | 0 | 1 | 0* | 1 | 1 | 0* | 0 | 1 |
| | ⋮ | 1 | 1 | 1 | 0 | 1 | 0 | 1 | 1 | 1* | 1 | 0* | 0 | 1 |
| | ⋮ | 1 | 1 | 1 | 0 | 1 | 0 | 1 | 1 | 0 | 1 | 0* | 0 | 1 |
| | 15 | 1 | 1 | 1 | 0 | 1 | 0 | 1 | 1 | 0 | 1 | 1 | 0 | 1 |
| IV | b | 1 | 1 | 1 | 0 | 1 | 0 | 1 | 0* | 1 | 1 | 0* | 0 | 1 |
| | ⋮ | 1 | 1 | 1 | 0 | 1 | 0 | 1 | 0* | 1 | 1 | 1 | 0 | 1 |
| | ⋮ | 1 | 1 | 1 | 0 | 1 | 0 | 1 | 1 | 1* | 1 | 1 | 0 | 1 |
| | 15 | 1 | 1 | 1 | 0 | 1 | 0 | 1 | 1 | 0 | 1 | 1 | 0 | 1 |

FIG.6

INVENTOR
NICOLAAS C.DE TROYE
BY
Frank R. Jifani
AGENT

United States Patent Office 3,535,544

Patented Oct. 20, 1970

3,535,544

MULTISTABLE CIRCUIT ARRANGEMENTS RESPONSIVE TO CLOCK PULSES (JK FLIP-FLOPS)

Nicolaas Cornelis deTroye, Emmasingel, Eindhoven, Netherlands, assignor, by mesne assignments, to U.S. Philips Corporation, New York, N.Y., a corporation of Delaware Filed Apr. 6, 1967, Ser. No. 628,920
Claims priority, application Netherlands, Apr. 27, 1966, 6605606
Int. Cl. H03k 3/26, 19/34
U.S. Cl. 307—215 2 Claims

ABSTRACT OF THE DISCLOSURE

An arrangement of logic gates having four stages, each stage having two NAND gates, the second and fourth stages having crosswise feedback connections, the first stage being forward cross coupled to the input of the third stage, and the output of the fourth stage being cross-feedback coupled to the input of the first stage.

Figure 1:
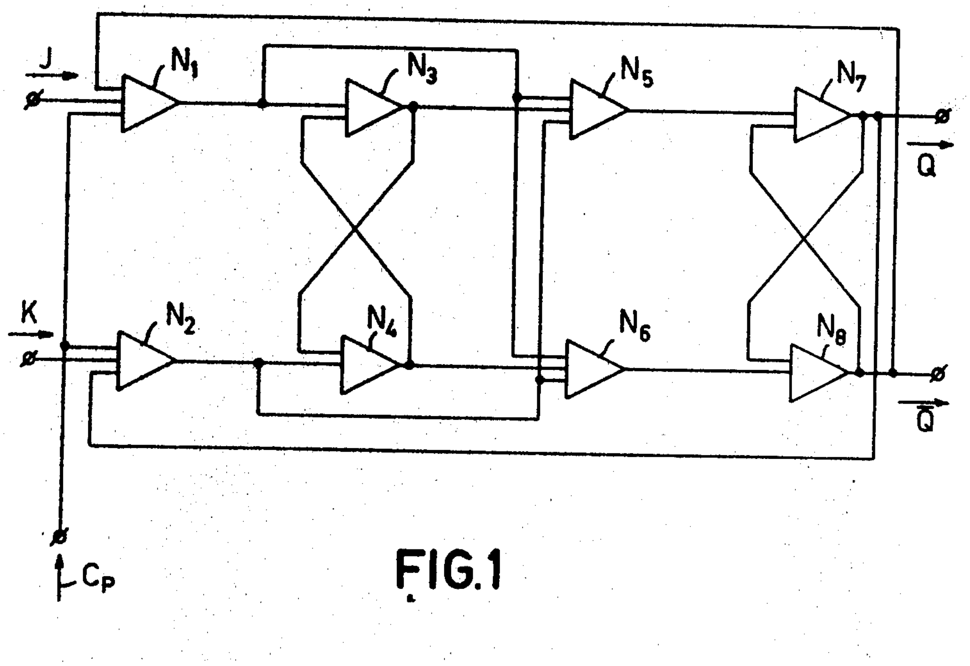

The invention relates to a multistable circuit arrangement responsive to clock pulses and having two input terminals for receiving two bivalent input signals and an output terminal for supplying a likewise bivalent output signal while upon reception of a clock pulse:

(a) the output signal is not varied if the input signals both have the value 0;
(b) the output signal assumes the value of one of the two input signals if these signals have different values;
(c) the output signal changes its value if the input signals both have the value 1.

This circuit arrangement includes four stages each com posed of two NAND's, the NAND's of the last stage supplying the output signal in the affirmative and in the negated form, while the NAND's of the first stage receive the clock pulses, the input signals and the output signal fed back in a crosswise manner while the NAND's of the second and of the fourth stage are each cross coupled; that is to say fed back in a crosswise manner.

Circuit arrangements fulfilling the function described above are referred to by Montgomery Phister, Jr., as JK flip-flops (cf. his book "Logical Design of Digital Computers," publisher John Wiley and Sons, New York, London). Known circuit arrangements having the said function are controlled by a two-phase clock pulse cycle. The invention has for its object to provide a circuit arrangement which can be controlled by a single-phase clock pulse cycle. This has the following advantages:

(1) The circuit arrangement operates at higher speed;
(2) The circuits producing clock pulses may be simpler, which may be of advantage especially in the case of small systems;
(3) The number of inputs of the circuit arrangement is reduced by one, which is advantageous especially in the case of a micro-miniaturization of the circuit arrangement.

According to the invention, this end is achieved in that the outputs of the two NAND's of the first stage are each connected to an input of each of the two NAND's of the third stage.

It will appear from the following description of the invention that the circuit arrangement according to the invention has no natural tendency to shelf-oscillation and invariably responds to its input signals in an unambiguous definite manner. In various known circuit arrangements of the said kind, this can be achieved only when the clock pulses satisfy additional conditions sometimes involving comparatively great difficulties.

A NAND circuit (hereinafter briefly termed NAND) is to be understood to mean herein a circuit arrangement having at least two inputs for receiving bivalent input signals and an output for supplying a bivalent output signal, which circuit arrangement supplies an output signal of the value 0 when all input signals have the value 1 and an output signal of the value 1 when at least one of the input signals has the value 0. If the input signals are represented by $x$, $y$, $z$, the output signal can be Boole-algebraically represented by: $\bar{x}$, $\bar{y}$, $\bar{z}=\bar{x}\vee\bar{y}\vee\bar{z}$.

The invention will now be described more fully with reference to the drawing.

Figure 2:
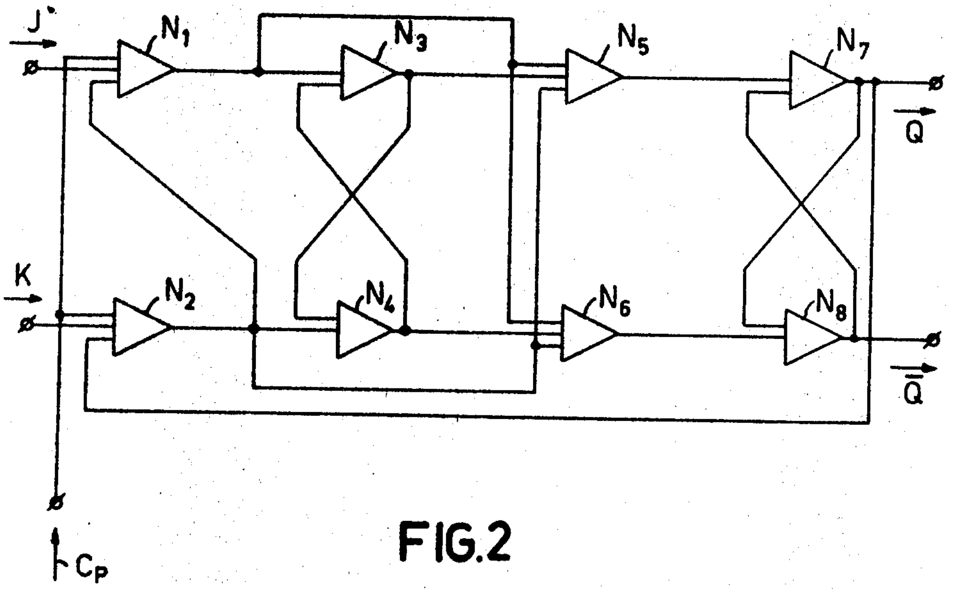

FIGS. 1 and 2 show the circuit diagrams of two embodiments of the invention;

FIGS. 3, 4, 5, and 6 show four tables for explaining more particularly the operation of the embodiment shown in FIG. 1.

The embodiment shown in FIG. 1 comprises eight NAND's $N_1$, $N_2$, . . . $N_8$ connected in the manner shown. The NAND's $N_3$ and $N_4$ of the second stage of the circuit arrangement and the NAND's $N_7$ and $N_8$ of the fourth stage are fed back crosswise. The last-mentioned NAND's supply the output signal both in the affirmative from Q and in the negated form $\overline{Q}$. Moreover, these NAND's are fed back crosswise to the inputs of the NAND's $N_1$ and $N_2$ of the first stage. Each of the latter NAND's moreover receives the clock pulses $C_p$ and the NAND's $N_1$ further receives the input signal J and the NAND $N_2$ the input signal K. The invention consists in that the outputs of the NAND $N_1$ and NAND $N_2$ are connected to the inputs of the NAND's $N_5$ and $N_6$, respectively.

The circuit arrangement of FIG. 2 differs from that of FIG. 1 in that the crosswise feedback between the NAND's $N_8$ and $N_1$ is replaced by a crosswise feedback between the NAND's $N_1$ and $N_2$.

The operation of the circuit arrangement of FIG. 1 can be explained most clearly with reference to the tables shown in FIGS. 3, 4, 5, and 6.

The table of FIG. 3 indicates the states of equilibrium of the circuit arrangement. It is found that the circuit arrangement may be in equilibrium for any combination of values of the signals $C_p$, J, K, and Q; the total number of states of equilibrium is this $2^4=16$.

The circuit arrangement is in a state of equilibrium when each NAND supplies the output signal prescribed by its input signals. For the NAND $N_1$, this is the signals $N_1=\overline{C}\vee\overline{J}\vee Q$ (a NAND and the signal supplied by it are designated by the same reference), that is to say that the NAND $N_1$ supplies an output signal of the value 1 when one or more of the signals $C_p$, J or $\overline{Q}$ have the value 0 and an output signal of the value 0 when the signal $C_p$, J and $\overline{Q}$ all have the value 1. The NAND $N_2$ supplies the output signal $\overline{C}_p\vee\overline{K}\vee\overline{Q}$, that is to say that the NAND $N_2$ supplies an output signal of the value 1 when one or more of the signals $C_p$, K or Q have the value 0 and an output signal of the value 0 when the signals $C_p$, K and Q all have the the value 1. Similarly for the remaining NAND's. For the sake of clarity and in order to facilitate a check, the table indicates for each NAND input signals ($C_p$, J, and $\overline{Q}$ for $N_1$; $C_p$, K, and Q for $N_2$; etc.).

It appears from the table of FIGURE 3 that there are four pairs of states of equilibrium, viz. 1/9, 2/10, 3/11, and 6/14 which differ from each other only by the value of the signal $C_p$ (the presence of absence of a clock pulse). These states of equilibrium can directly change pairwise one into the other.

The table of FIG. 4 indicates the situation arising when the circuit arrangement is initially in a state of equilibrium for which $C_p=0$ (clock pulse fails) and then receives a clock pulse ($C_p=1$) which disappears after some time (again $C_p=1$). It appears from the foregoing that the changes of state 1→9→1, 2→10→2, 3→11→3, and 6→14→6 can take place without passing through intermediate states.

It is found, however, that the changes of state 4→12→3, 5→13→6, 7→15→8, and 8→16→7 can also take place, but through a few non-stable states.

The table of FIG. 5 provides a survey of the possible changes of state, the changes taking place without intermediate states being indicated by the letter *d* (direct) and the changes taking place through intermediate states being indicated by *i* (indirect). It is apparent from this table that the circuit arrangement actually fulfils the function of the JK flip-flop defined above.

Let it be assumed that the circuit arrangement is initially in the state of equilibrium 5 (FIG. 4) and receives in this state a clock pulse (the value of $C_p$ changes from 0 to 1). As a result, the NAND $N_1$ is no longer in a state of equilibrium (indicated in the table of FIG. 4 by an asterisk) and the value of its output signal changes from 1 to 0. In this state (line *a* of the table), however, the NAND's $N_3$ and $N_6$ are no longer in a state of equilibrium. It is assumed for the time being that these NAND's operate at accurately the same speed and that the values of the output signals of said two NAND's change simultaneously from 0 to 1. In this state, the NAND $N_4$ is no longer in a state of equilibrium so that the value of its output signal changes from 1 to 0. Consequently, the circuit arrangement has changed over to the state of equilibrium 13.

If from the latter state of equilibrium the clock pulse disappears (the value of $C_p$ changes from 1 to 0), the circuit arrangement changes over to the state of equilibrium 6 through a plurality of intermediate states in which successively the NAND's $N_1$, $N_5$, $N_7$, and $N_8$ are not in equilibrium. This can be seen from the table.

The change of state 7→15→8 is also indicated in the table and the relavant part of the table must be interpreted in a corresponding manner.

With regard to the symmetry of the circuit arrangement with respect to the signals J and K, the changes 2→10→2, 3→11→3, 4→12→3, and 8→16→7 are not included in the table.

It appears from the table of FIG. 6 that it is not necessary for the NAND's $N_5$ and $N_6$ of the third state to operate at accurately the same speed as the NAND's $N_3$ and $N_5$ of the second state, since the circuit arrangement reaches the same final state when the two NAND's of the third state operate either at a considerably higher speed or at a considerably lower speed than the NAND's of the second stage.

Let it be assumed, for example, that the circuit arrangement is in the intermediate state *a* and that the NAND's $N_5$ and $N_6$ operate at a considerably lower speed than the NAND's $N_3$ and $N_4$. The circuit arrangement then reaches through the intermediate states indicated in section I the state of equilibrium 13. If on the contrary the NAND's $N_5$ and $N_6$ operate at a considerably higher speed than the NAND's $N_3$ and $N_4$, the circuit arrangement reaches through the intermediate states indicated in section II the state of equilibrium 13. An similar s ituation arises when the circuit arrangement is in the state *b*.

Thus, it is found that the circuit arrangement invariably reaches the same final state, though through different intermediate states, in other words that the response of the circuit arrangement is unambiguously defined by the input signals.

What is claimed is:

1. A multistable circuit with two stable states having one clock pulse terminal, two input terminals for receiving a bivalent input signal, and two output terminals for supplying a bivalent output singal with relatively complementary values for each stable state, comprising; first, second, third and fourth stages, each of said stages including two NAND gates, each first NAND gate of said second, third and fourth stages receiving an input from corresponding first NAND gates in the respective preceding stage, each second NAND gate of said second, third and fourth stages receiving an input from corresponding second NAND gates in the respective preceding stage, said first NAND gate of said first stage receiving a clock pulse input from said clock pulse terminal, one of said bivalent input signals, and an output signal of the noncorresponding second NAND gate of said fourth stage, said second NAND gate of said first stage receiving a clock pulse input from said clock pulse terminal, the other of said bivalent input signals and the output signal of the noncorresponding second NAND gate of said first stage, means cross coupling the NAND gates of said second stage, means cross coupling the NAND gates of said fourth stage, means connecting the output of each NAND gate of said first stage to the input of both NAND gates of said third stage.

2. A multistable circuit with two stable states having one clock pulse terminal, two input terminals for receiving a bivalent input signal, and two output terminals for supplying a bivalent output signal with relatively complementary values for each stable state, comprising; first, second, third and fourth stages, each of said stages including two NAND gates, each first NAND gate of said second, third and fourth stages receiving an input from corresponding first NAND gates in the respective preceding stage, each second NAND gate of said second, third and fourth stages receiving an input from corresponding second NAND gates in the respective preceding stage, said first NAND gate of said first stage receiving a clock pulse input from said clock pulse terminal, one of said bivalent input signals, and an output signal of the noncorresponding second NAND gate of said fourth stage, said second NAND gate of said first stage receiving a clock pulse input from said clock pulse terminal, the other of said bivalent input signals and the output signal of the noncorresponding second NAND gate of said fourth stage, means cross coupling the NAND gates of said second stage, means cross coupling the NAND gates of said fourth stage, means connecting the output of each NAND gate of said first stage to the input of both NAND gates of said third stage.

References Cited

UNITED STATES PATENTS

| | | | |
|---|---|---|---|
| 3,225,301 | 12/1965 | McCann | 307—269 |
| 3,286,245 | 4/1966 | Cozart | 307—215 |
| 3,310,660 | 3/1967 | Cogar | 307—225 |

DONALD D. FORRER, Primary Examiner

H. A. DIXON, Assistant Examiner

U.S. Cl. X.R.

307—269, 291